(12) United States Patent
Homma et al.

(10) Patent No.: US 9,891,737 B2
(45) Date of Patent: Feb. 13, 2018

(54) INFORMATION PROCESSING APPARATUS, INFORMATION PROCESSING METHOD AND PROGRAM

(71) Applicant: DRNC Holdings, Inc., Wilmington, DE (US)

(72) Inventors: Fuminori Homma, Tokyo (JP); Kouichi Matsuda, Tokyo (JP); Tatsushi Nashida, Kanagawa (JP)

(73) Assignee: DRNC Holdings, Inc., Wilmington, DE (US)

( * ) Notice: Subject to any disclaimer, the term of this patent is extended or adjusted under 35 U.S.C. 154(b) by 0 days.

(21) Appl. No.: 13/949,368

(22) Filed: Jul. 24, 2013

(65) Prior Publication Data

US 2013/0328831 A1 Dec. 12, 2013

Related U.S. Application Data

(63) Continuation of application No. 12/637,499, filed on Dec. 14, 2009, now Pat. No. 8,537,127.

(30) Foreign Application Priority Data

Dec. 15, 2008 (JP) ............................... P2008-318573
Jul. 28, 2009 (JP) ............................... P2009-175581

(51) Int. Cl.
*G06F 3/041* (2006.01)
*G06F 3/0484* (2013.01)
(Continued)

(52) U.S. Cl.
CPC .......... *G06F 3/0414* (2013.01); *G06F 3/0488* (2013.01); *G06F 3/04847* (2013.01); *G06F 3/04855* (2013.01)

(58) Field of Classification Search
CPC .... G06F 3/041; G06F 3/0414; G06F 3/04855; G06F 3/04847; G06F 3/0488
(Continued)

(56) References Cited

U.S. PATENT DOCUMENTS 6,922,816 B1 * 7/2005 Amin .................. G06F 3/04847
715/732
6,931,594 B1 8/2005 Jun
(Continued)

FOREIGN PATENT DOCUMENTS

EP 1 843 348 10/2007
EP 2 088 502 8/2009
(Continued)

OTHER PUBLICATIONS

Mar. 19, 2013, EPO Communication regarding related application No. EP 09 25 2590.

*Primary Examiner* — Andrew Sasinowski
(74) *Attorney, Agent, or Firm* — Condo Roccia Koptiw LLP

(57) ABSTRACT

An information processing apparatus is provided which include a display control unit that causes a touch panel to display a slider to specify one of specifiable values by an operating body as a specified value and a start edge value and an end edge value stored in a storage unit and if the touch panel acquires position information indicating position on the slider, decides a value corresponding to the position information as the specified value and also decides an interval to decide a new specifiable range in accordance with a contact state quantity acquired by the contact state quantity acquisition unit, specifies the new specifiable range based on the interval using the specified value as a reference.

6 Claims, 15 Drawing Sheets

(51) Int. Cl.
*G06F 3/0488* (2013.01)
*G06F 3/0485* (2013.01)

(58) Field of Classification Search
USPC .................................................. 345/173–178
See application file for complete search history.

(56) References Cited

U.S. PATENT DOCUMENTS

| | | | |
|---|---|---|---|
| 7,173,623 B2 | 2/2007 | Calkins et al. | |
| 7,644,367 B2 | 1/2010 | McKeon et al. | |
| 2002/0063737 A1* | 5/2002 | Feig ................... | G06F 3/04847 715/786 |
| 2006/0022955 A1* | 2/2006 | Kennedy ............... | G06F 3/0414 345/173 |
| 2007/0222767 A1 | 9/2007 | Wang et al. | |
| 2007/0229455 A1 | 10/2007 | Martin et al. | |
| 2008/0048993 A1 | 2/2008 | Yano | |
| 2008/0062148 A1 | 3/2008 | Hotelling et al. | |
| 2008/0094367 A1* | 4/2008 | Van De Ven et al. | ........ 345/173 |
| 2008/0165141 A1* | 7/2008 | Christie ................. | G06F 3/044 345/173 |

FOREIGN PATENT DOCUMENTS

| | | |
|---|---|---|
| JP | PUB 2000-082048 | 3/2000 |
| JP | 2000-353040 A | 12/2000 |
| JP | 2002-213989 A | 7/2002 |
| JP | 2006-268073 A | 10/2006 |
| JP | 2006-351042 | 12/2006 |
| JP | 2007-240889 A | 9/2007 |
| JP | 2001-202176 A | 7/2014 |
| RU | 2327218 C2 | 6/2008 |
| RU | 2336557 C2 | 10/2008 |

* cited by examiner

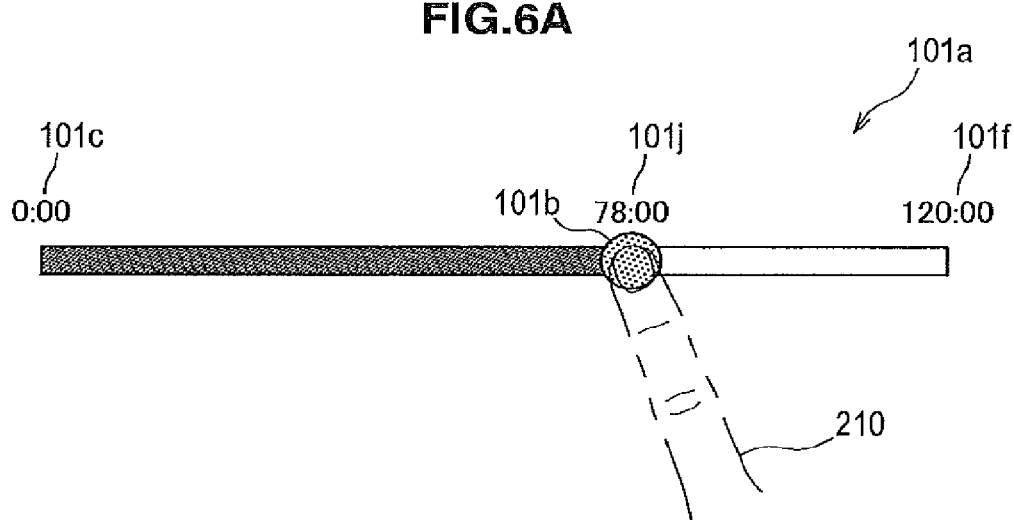
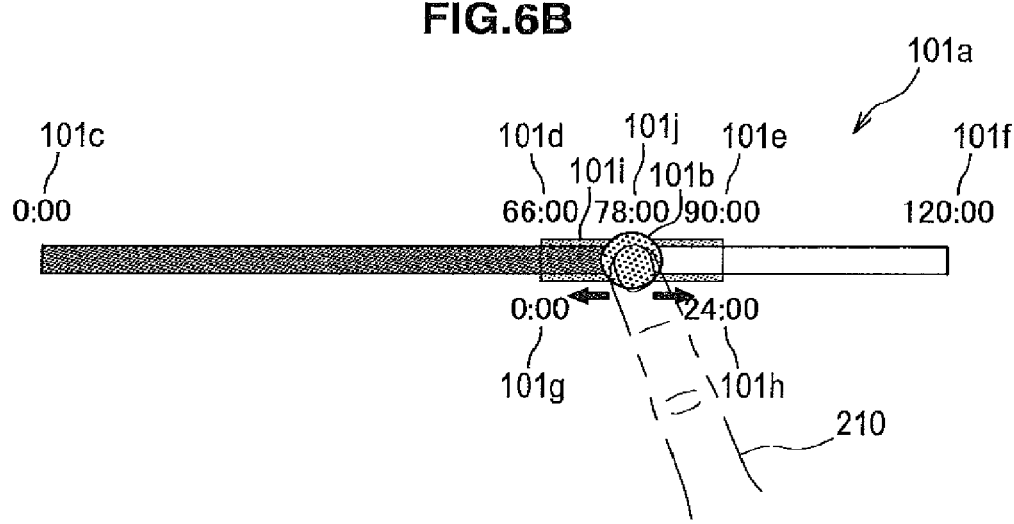
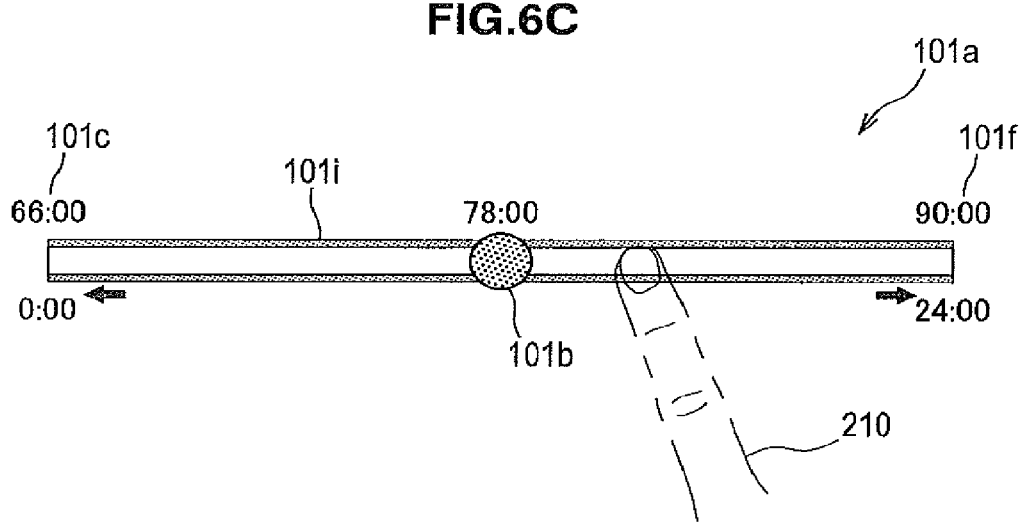

INFORMATION PROCESSING APPARATUS, INFORMATION PROCESSING METHOD AND PROGRAM

CROSS REFERENCE TO PRIOR APPLICATIONS

This application is a continuation of U.S. patent application Ser. No. 12/637,499, filed Dec. 14, 2009, claiming priority to Japanese Patent Application Nos. P2009-175581 (filed on Jul. 28, 2009) and P2008-318573 (filed on Dec. 15, 2008), which are all hereby incorporated by reference in their entirety.

BACKGROUND OF THE INVENTION

Field of the Invention

The present invention relates to an information processing apparatus, an information processing method, and a program.

Description of the Related Art

In recent years, with advances in electronic engineering, mobile information terminals using a touch panel (also called a "touch screen") have been widely used. When seeks of a reproduction position of video content, music content or the like are done using such a mobile information terminal, as shown in FIG. 18, a slider has been frequently used. A mobile information terminal using a slider is disclosed by, for example, Japanese Patent Application Laid-Open No. 2006-351042.

SUMMARY OF THE INVENTION

However, the slider displayed in a mobile information terminal using a touch screen in related art is arranged in a limited screen area for the mobile terminal. When the slider is operated in a PC screen by a pointing device such as a mouse, the ratio of a slider length in the PC screen to the mouse pointer is relatively high, making the operation thereof easier. On the other hand, when the slider displayed in a touch screen is operated by a finger, the ratio of the slider length in the screen to the breadth of the tapping finger is frequently low. Thus, due to restrictions that a thumb of the slider can be moved only by dragging, for example, it is difficult to perform a fine operation such as setting 120-min video content forward by 15 seconds. Particularly when an electrostatic touch panel is used, it is difficult to accurately obtain pointing information indicating the position selected by the finger because noise is carried by electrostatic information, making fine seeks a very difficult operation.

Faced with such difficulties, a technique to dynamically adjust the double speed of fast forward and fast backward depending on a relative distance between the tapped position and the current reproduction position is proposed. In this case, however, there is an issue that it becomes difficult to directly specify the reproduction position with an absolute value.

The present invention has been made in view of the above issue and it is desirable to provide a novel and improved technology capable of directly specifying the position of a slider displayed in a touch panel and easily adjusting the specified position.

According to an embodiment of the present invention, there is provided an information processing apparatus including a touch panel having a contact surface that can come into contact with an operating body and capable of acquiring position information indicating a contact position on the contact surface with the operating body and displaying information, a contact state quantity acquisition unit that acquires a contact state quantity indicating a contact state of the touch panel with the operating body, a storage unit that stores a start edge value of a specifiable range, which is a set of specifiable values that can be specified by the operating body, and an end edge value of the specifiable range and a display control unit that causes the touch panel to display a slider to specify one of the specifiable values by the operating body as a specified value and the start edge value and the end edge value stored in the storage unit and if the touch panel acquires position information indicating the position on the slider, decides a value corresponding to the position information as the specified value and also decides an interval to decide a new specifiable range in accordance with the contact state quantity acquired by the contact state quantity acquisition unit, specifies the new specifiable range based on the interval using the specified value as a reference, updates the start edge value stored in the storage unit with the start edge value of the new specifiable range and also updates the end edge value stored in the storage unit with the end edge value of the new specifiable range, and causes the touch panel to display the start edge value and the end edge value stored in the storage unit.

The contact state quantity acquisition unit may include a contact time measuring unit that measures a contact time indicating a time in which the operating body continues to be in contact with an identical position of the touch panel up to a present time and acquires the contact time as the contact state quantity.

The contact state quantity acquisition unit may include a contact area measuring unit that measures a contact area of the touch panel with the operating body and acquires the contact area as the contact state quantity.

The contact state quantity acquisition unit may include a contact area measuring unit that measures a contact area of the touch panel with the operating body and an area increase calculation unit that calculates an area increase, which is an increase of the contact area measured by the contact area measuring unit, in a predetermined time up to a present time and acquires the area increase as the contact state quantity.

The contact state quantity acquisition unit may include a pressure measuring unit that measures a magnitude of pressure exerted on the touch panel by the operating body and acquires the magnitude of the pressure as the contact state quantity.

The contact state quantity acquisition unit may include a pressure measuring unit that measures a magnitude of pressure exerted on the touch panel by the operating body and a pressure increase calculation unit that calculates a pressure increase, which is an increase in magnitude of the pressure measured by the pressure measuring unit, in a predetermined time up to a present time and acquires the pressure increase as the contact state quantity.

The storage unit may further store a threshold and the display control unit may determine whether the contact state quantity acquired by the contact state quantity acquisition unit exceeds the threshold stored in the storage unit and, if it is determined that the contact state quantity does not exceed the threshold, omits processing to decide an interval to decide a new specifiable range, processing to specify the new specifiable range based on the interval using the specified value as a reference, and processing to update the start edge value stored in the storage unit with the start edge value of the new specifiable range and also update the end edge value stored in the storage unit with the end edge value of the new specifiable range.

The contact state quantity acquisition unit may further include a contact time measuring unit that measures a contact time indicating a time in which the operating body continues to be in contact with an identical position of the touch panel up to a present time and acquires the contact time as the contact state quantity and the display control unit may determine whether the contact time acquired by the contact time measuring unit exceeds the threshold stored in the storage unit and, if it is determined that the contact time does not exceed the threshold, further determines whether the touch panel has acquired other position information than the position information indicating the position on the slider and, if the other position information has been acquired, does not omit processing to decide the interval to decide the new specifiable range, processing to specify the new specifiable range based on the interval using the specified value as a reference, and processing to update the start edge value stored in the storage unit with the start edge value of the new specifiable range and also update the end edge value stored in the storage unit with the end edge value of the new specifiable range.

The display control unit may calculate an output value by accepting the contact state quantity acquired by the contact state quantity acquisition unit as an input value based on a predetermined calculation formula and decides the output value as an interval to decide the new specifiable range.

The storage unit may further store a constant to decide the interval and the display control unit may decide a value obtained by dividing a value obtained by subtracting the end edge value from the start edge value stored in the storage unit by the constant stored in the storage unit as the interval.

The display control unit may acquire the start edge value by subtracting a value half the interval from the specified value and also acquires the end edge value by adding the value half the interval to the specified value to specify the new specifiable range using the start edge value and the end edge value.

The display control unit, when the touch panel acquires the position information indicating the position of a start edge of the slider after the start edge value and the end edge value stored in the storage unit being updated, may update the start edge value stored in the storage unit with a new start edge value by obtaining the new start edge value by subtracting a scroll value, which is a value in accordance with the interval, from the start edge value stored in the storage unit and also may update the end edge value stored in the storage unit with a new end edge value by obtaining the new end edge value by subtracting the scroll value from the end edge value stored in the storage unit and may cause the touch panel to display the start edge value and the end edge value stored in the storage unit.

The information processing apparatus may further include a processing unit that performs processing in accordance with the position information indicating the position on the slider acquired by the touch panel.

According to the present invention, as described above, there can be provided a technology capable of directly specifying the position of a slider and easily adjusting the specified position.

BRIEF DESCRIPTION OF THE DRAWINGS

FIGS. 6A-6C are explanatory views (Part 1) illustrating the function of the display control unit of the information processing apparatus according to the first embodiment of the present invention;

DETAILED DESCRIPTION OF THE EMBODIMENTS

Figure 1:
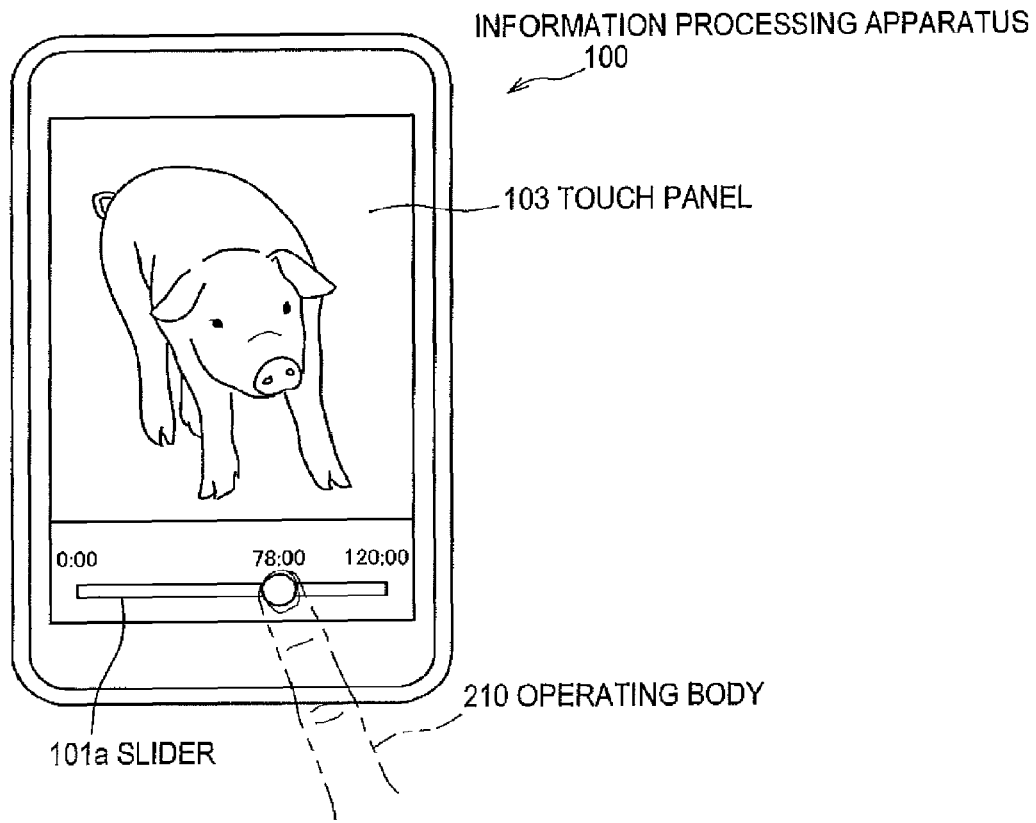
FIG. 1 is a diagram showing a usage example of an information processing apparatus according to a first embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted. The description is provided in the order shown below:

1. First Embodiment
   1-1. Usage Example of Information Processing Apparatus
   1-2. Hardware Configuration of Information Processing Apparatus
   1-3. Function of Information Processing Apparatus
   1-4. Function of Display Control Unit of Information Processing Apparatus
   1-5. Operation of Information Processing Apparatus
2. Second Embodiment
   2-1. Function of Information Processing Apparatus
   2-2. Operation of Information Processing Apparatus
3. Third Embodiment
   3-1. Hardware Configuration of Information Processing Apparatus
   3-2. Function of Information Processing Apparatus
   3-3. Operation of Information Processing Apparatus
4. Fourth Embodiment
   4-1. Function of Information Processing Apparatus
   4-2. Operation of Information Processing Apparatus 1. First Embodiment First, the first embodiment of the present invention will be described.

[1-1. Usage Example of Information Processing Apparatus]

First, a usage example of an information processing apparatus according to the first embodiment of the present invention will be described. FIG. 1 is a diagram showing a usage example of an information processing apparatus according to the first embodiment of the present invention. A usage example of the information processing apparatus according to the first embodiment of the present invention will be described using FIG. 1.

In the first embodiment of the present invention, an information processing apparatus 100 (such as a mobile device) provided with a touch panel 103 on the front side will be described. A user directly selects the position on a slider 101a displayed in the touch panel 103. The user uses, for example, an operating body 210 for a tap operation in the touch panel 103.

It is assumed below that a forefinger of the right hand of the user is used as the operating body 210, but the operating body 210 is not limited to the forefinger of the right hand and any finger that is easy for the user to use may be used. For example, a finger of the left hand may be used or another finger (a thumb, middle finger, fourth finger, or little finger) may be used.

In the foregoing, a usage example of the information processing apparatus 100 according to the first embodiment of the present invention has been described. Next, the hardware configuration of the information processing apparatus 100 according to the first embodiment of the present invention will be described.

[1-2. Hardware Configuration of Information Processing Apparatus]

Figure 2:
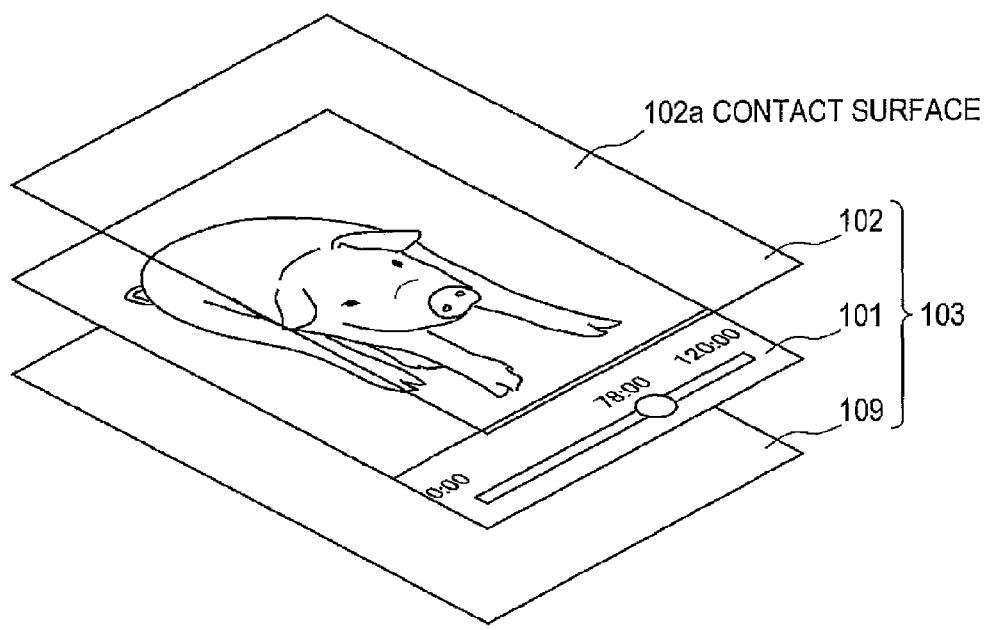
FIG. 2 is an exploded perspective view showing a hardware configuration of the information processing apparatus according to the first embodiment of the present invention.

Next, the hardware configuration of an information processing apparatus according to the first embodiment of the present invention will be described. FIG. 2 is an exploded perspective view showing the hardware configuration of an information processing apparatus according to the first embodiment of the present invention. The hardware configuration of the information processing apparatus according to the first embodiment of the present invention will be described below using FIG. 2 (FIG. 1 is also referenced when appropriate). When the information processing apparatus 100 according to the first embodiment should be distinguished from the information processing apparatus 100 according to other embodiments, the information processing apparatus will be denoted as an information processing apparatus 100a. If there is no need to distinguish the information processing apparatus 100, the information processing apparatus will be denoted as the information processing apparatus 100.

As shown in FIG. 2, an information input apparatus 102 is placed on the top surface of the information processing apparatus 100a. The information input apparatus 102 has a contact surface 102a capable of coming into contact with the operating body 210 of the user and can acquire position information indicating the contact position with the operating body 210 on the contact surface 102a. The information input apparatus 102 outputs the acquired position information to a CPU 108 as an information signal. The user of the information processing apparatus 100a can input various kinds of data into the information processing apparatus 100a or provide instructions of processing operation by operating the information input apparatus 102 through the operating body 210. The information input apparatus 102 forms a portion of the touch panel 103. In the first embodiment, any type of touch panel capable of obtaining position information indicating the contact position with the operating body 210 on the contact surface 102a may be used as the touch panel 103.

A display device 101 is placed below the information input apparatus 102. The display device 101 is enabled to display information. The display device 101 forms a portion of the touch panel 103. The display device 101 is configured of an apparatus capable of visually notifying the user of information such as an LCD (Liquid Crystal Display) and organic EL (Electroluminescence) display device. The display device 101 outputs, for example, results obtained by various kinds of processing performed by the information processing apparatus 100a. More specifically, the display device 101 displays results obtained by various kinds of processing performed by the information processing apparatus 100a by text or images.

A base 109 is placed below the display device 101. Various components or devices used by the information processing apparatus 100a are mounted on the base 109. More specifically, devices such as a non-volatile memory 106, a RAM (Random Access Memory) 107, a CPU (Central Processing Unit) 108 and the like described using FIG. 3 later are mounted.

Figure 3:
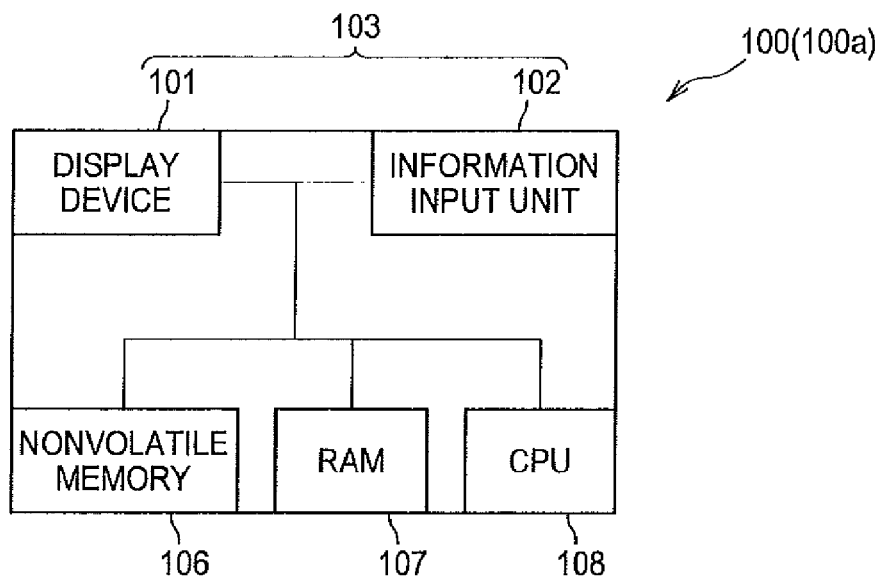
FIG. 3 is a block diagram showing the hardware configuration of the information processing apparatus according to the first embodiment of the present invention.

FIG. 3 is a block diagram showing the hardware configuration of the information processing apparatus according to the first embodiment of the present invention. The hardware configuration of the information processing apparatus according to the first embodiment of the present invention will be described below using FIG. 3 (FIG. 1 and FIG. 2 are also referenced when appropriate).

As shown in FIG. 3, the information processing apparatus 100a according to the first embodiment of the present invention includes the touch panel 103 (the display device 101 and the information input apparatus 102), the non-volatile memory 106, the RAM 107, and the CPU 108.

The non-volatile memory (storage unit) 106 is a data storage apparatus formed as an example of the storage unit of the information processing apparatus 100a and is configured of, for example, a magnetic storage device such as an HDD (Hard Disk Drive), semiconductor storage device, optical storage device, or magneto-optical storage device. The non-volatile memory 106 stores programs executed by the CPU 108 and various kinds of data.

The RAM 107 temporarily stores programs used by the CPU 108 and parameters that appropriately change during execution thereof.

The CPU 108 functions as an arithmetic processing unit and a control apparatus and controls the overall operation inside the information processing apparatus 100 or a portion thereof according to various programs recorded in the non-volatile memory 106 or the RAM 107. The CPU 108 is formed as a portion of the control unit of the information processing apparatus 100a.

In the foregoing, an example of the hardware configuration that can realize the function of the information processing apparatus 100a according to the first embodiment of the present invention has been shown. Each of the above components may be configured using general-purpose members or hardware specialized for the function of each component. Therefore, the hardware configuration to be used can be changed appropriately in accordance with the technical level each time when the first embodiment is carried out.

In the foregoing, the hardware configuration of the information processing apparatus 100a according to the first embodiment of the present invention has been described. Next, the function of the information processing apparatus 100a according to the first embodiment of the present invention will be described.

[1-3. Function of Information Processing Apparatus]

Figure 4:
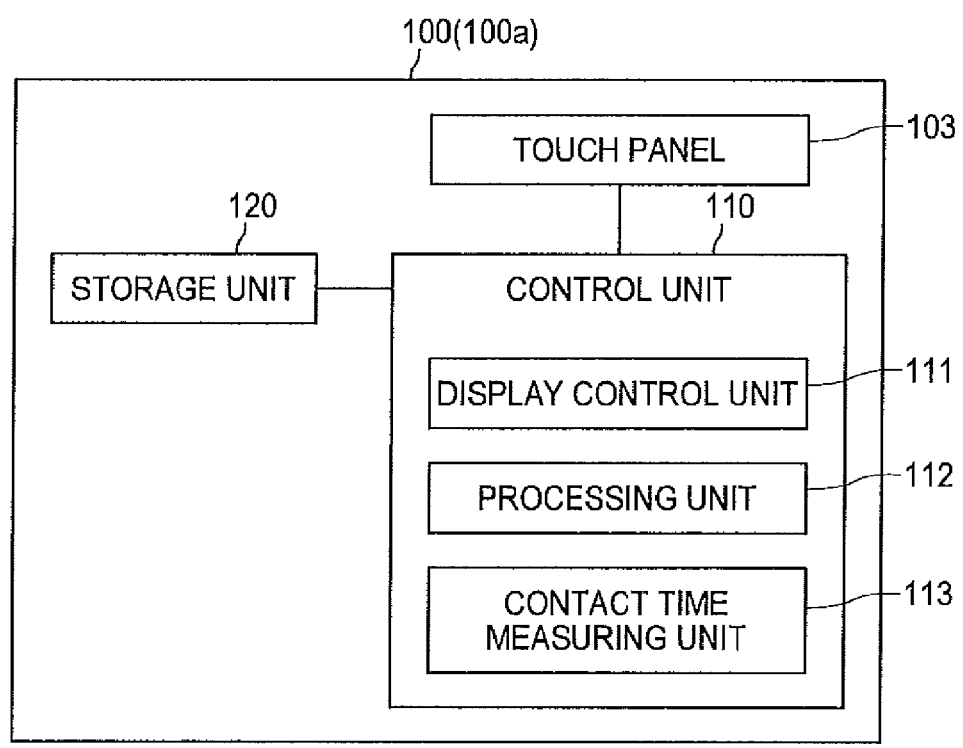
FIG. 4 is a functional block diagram of the information processing apparatus according to the first embodiment of the present invention.

FIG. 4 is a functional block diagram of the information processing apparatus according to the first embodiment of the present invention. The function of the information processing apparatus according to the first embodiment of the present invention will be described below using FIG. 4 (FIG. 1 to FIG. 3 are also referenced when appropriate).

As shown in FIG. 4, the information processing apparatus 100a according to the first embodiment includes the touch panel 103, a control unit 110, and a storage unit 120. The control unit 110 is configured of a display control unit 111 and a processing unit 112. The display control unit 111 will be described later with reference to FIG. 5. The control unit 110 is provided with a contact state quantity acquisition unit (for example, a contact time measuring unit 113) for acquiring a contact state quantity indicating a contact state of the operating body 210 and the touch panel 103.

The touch panel 103 has the contact surface 102a capable of coming into contact with the operating body 210 so that position information indicating the contact position with the operating body 210 on the contact surface 102a can be obtained and also information can be displayed.

The contact state quantity acquisition unit (for example, the contact time measuring unit 113) included in the control unit 110 is provided with the contact time measuring unit 113 that measures a contact time indicating a time interval in which the operating body 210 has been in contact with the same position of the touch panel 103 up to the present time and acquires the contact time as a contact state quantity.

The storage unit 120 stores a start edge value of a specifiable range, which is a set of specifiable values that can be specified by the operating body 210, and an end edge value of the specifiable range. The start edge value is, for example, the minimum value of the specifiable range and the end edge value is, for example, the maximum value of the specifiable range. However, the start edge value and the end edge value are not limited to the above example, the start edge value may be the maximum value of the specifiable range, and the end edge value may be the minimum value of the specifiable range.

The processing unit 112 performs processing in accordance with position information indicating the position on a slider acquired by the touch panel 103. Processing in accordance with position information is not specifically limited and if the storage unit 120 stores content data, processing may be to adjust the reproduction position of the content data stored by the storage unit 120 to the value corresponding to position information acquired by the touch panel 103. Moreover, processing in accordance with position information is not limited to processing to adjust the reproduction position of content data and if, for example, content data is audio data, may be processing to adjust the output value (such as an output volume) when the content data is reproduced to the value corresponding to position information.

Figure 5:
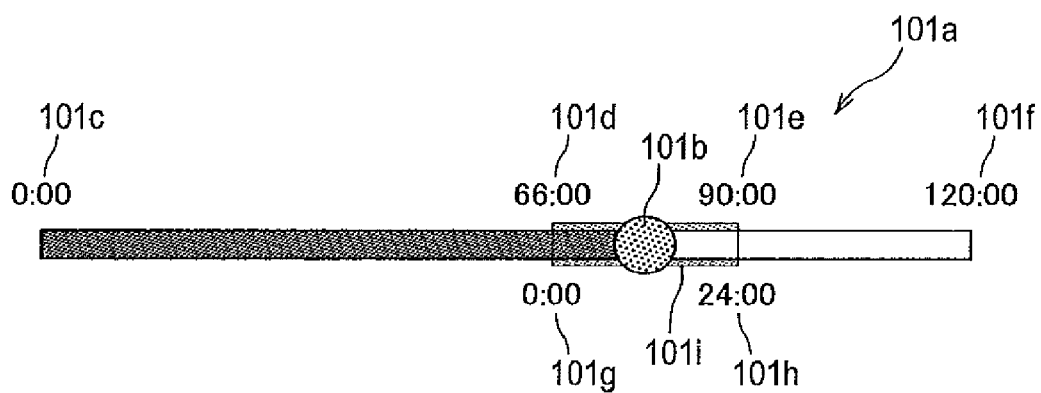
FIG. 5 is a diagram showing a screen display example by a display control unit of the information processing apparatus according to the first embodiment of the present invention.

FIG. 5 is a diagram showing a screen display example by a display control unit of the information processing apparatus according to the first embodiment of the present invention. A screen display example by the display control unit of the information processing apparatus according to the first embodiment of the present invention will be described below using FIG. 5 (FIG. 1 to FIG. 4 are also referenced when appropriate).

FIG. 5 shows the slider 101a displayed by the display control unit 111 in the touch panel 103. Here, the slider 101a is assumed to correspond to at least a specifiable range displayed in the touch panel 103. A thumb 101b is displayed on the slider 101a at the position corresponding to the specified value currently specified. A start edge value 101c is the minimum value of the specifiable range and an end edge value 101f is the maximum value of the specifiable range.

FIG. 5 also shows a zoom slider 101i displayed by the display control unit 111 in the touch panel 103. Here, the zoom slider 101i is displayed at the position corresponding to the aforementioned new specifiable range. A start edge value 101d of the zoom slider 101i is the minimum value of the new specifiable range and an end edge value 101e of the zoom slider 101i is the maximum value of the new specifiable range. The thumb 101b displayed on the slider 101a also serves as a thumb displayed on the zoom slider 101i. If no operation is performed by the operating body 210, the start edge value 101d and the end edge value 101e of the zoom slider 101i are the same as values corresponding to the thumb 101b and the zoom slider 101i is not displayed.

An interval start edge value 101g shows the start edge value of an interval to decide a new specifiable range and is denoted here as "0:00". An interval end edge value 101h shows the end edge value of an interval to decide a new specifiable range and is denoted here as "24:00".

[1-4. Function of Display Control Unit of Information Processing Apparatus]

FIG. 6 is an explanatory view (Part 1) illustrating the function of the display control unit of the information processing apparatus according to the first embodiment of the present invention. FIG. 7 is an explanatory view (Part 2) illustrating the function of the display control unit of the information processing apparatus according to the first embodiment of the present invention. FIG. 8 is an explanatory view (Part 3) illustrating the function of the display control unit of the information processing apparatus according to the first embodiment of the present invention. The function of the display control unit of the information processing apparatus according to the first embodiment of the present invention will be described below using FIG. 6 to FIG. 8 (FIG. 1 to FIG. 5 are also referenced when appropriate).

FIG. 6A shows the slider 101a displayed when the touch panel 103 acquires position information. The display control unit 111 causes the touch panel 103 to display the slider 101a to specify one of specifiable values as the specified value through the operating body 210 and the start edge value 101c and the end edge value 101f stored in the storage unit 120. The thumb 101b may be displayed on the slider 101a at the position corresponding to the specified value currently specified. The display control unit 111 may cause the touch panel 103 to display a specified value 101j currently specified near the thumb 101b.

When the touch panel 103 acquires position information indicating the position on the slider 101a, the display control unit 111 decides the value corresponding to the acquired position information as the specified value. Here, the display control unit 111 is enabled to determine one specifiable value corresponding to the position information and decides the determined specifiable value as the specified value. In the example shown in FIG. 6A, the position on the slider 101a corresponding to the reproduction time 78 min of content data whose reproduction time 120 min is first tapped by the operating body 210.

The display control unit 111 decides the specified value and also decides an interval to decide a new specifiable range in accordance with a contact state quantity acquired by the contact state quantity acquisition unit (for example, the contact time measuring unit 113). In the first embodiment, the contact time measuring unit 113 measures a contact time indicating a time in which the operating body 210 has been in contact with the same position of the touch panel 103 up to the present time and acquires the contact time as a contact state quantity.

The storage unit 120 may further store a threshold so that the display control unit 111 determines whether a contact state quantity acquired by the contact state quantity acquisition unit (for example, the contact time measuring unit 113) exceeds the threshold stored in the storage unit 120. In this manner, the display control unit 111 may decide an interval to decide a new specifiable range only if the display control unit 111 determines that a contact state quantity exceeds the threshold. That is, if the display control unit 111 determines that a contact state quantity does not exceed the threshold, the display control unit 111 may omit processing to decide an interval to decide a new specifiable range. The display control unit 111 may further omit processing to specify a new specifiable range by an interval using a specified value as a reference. The display control unit 111 may further omit processing to update the start edge value stored in the storage unit 120 with a start edge value of a new specifiable range and the end edge value stored in the storage unit 120 with an end edge value of the new specifiable range.

In the first embodiment, the display control unit 111 determines whether the contact time acquired by the contact time measuring unit 113 exceeds a threshold stored in the storage unit 120. If the display control unit 111 determines that the contact time does not exceed the threshold, the display control unit 111 may further determine whether the touch panel 103 has acquired other position information than the position information indicating the position on the slider 101a. If the display control unit 111 determines that other position information has been acquired, the display control unit 111 may perform processing to decide an interval to decide a new specifiable range without omitting the processing. In this case, the display control unit 111 may perform processing to specify a new specifiable range by an interval using a specified value as a reference without omitting the processing. The display control unit 111 may perform processing to update the start edge value stored in the storage unit with a start edge value of a new specifiable range and the end edge value stored in the storage unit with an end edge value of the new specifiable range without omitting the processing.

In the first embodiment, the contact time measuring unit 113 determines whether the measured contact time exceeds the threshold (for example, 2 sec). The magnitude of the threshold is not specifically limited and a threshold of magnitude easier to use for the user may be stored in the storage unit 120 in advance or any threshold may freely be set by the user.

The display control unit 111 may calculate an output value based on a predetermined calculation formula by accepting a contact state quantity acquired by the contact state quantity acquisition unit (for example, the contact time measuring unit 113) as an input value to decide the output value as an interval to decide a new specifiable range. Here, the predetermined calculation formula that outputs an interval after a contact state quantity being input is not specifically limited and may be, for example, a calculation formula representing a relationship in which the contact state quantity and the interval are proportional.

The display control unit 111 specifies a new specifiable range based on the decided interval using the decided value as a reference. FIG. 6B shows the slider 101a displayed after a new specifiable range being decided the display control unit 111. As shown in FIG. 6B, the display control unit 111 may cause the touch panel 103 to display the zoom slider 101i.

The storage unit 120 further stores a constant to decide an interval and the display control unit 111 can decide, for example, a value obtained by dividing a value obtained by subtracting an end edge value from a start edge value stored in the storage unit 120 by the constant stored in the storage unit 120 as an interval. FIG. 6B shows a case in which the constant stored in the storage unit 120 is "5", the start edge value stored in the storage unit 120 is "0:00", and the end edge value stored in the storage unit 120 is "120:00". In this case, the display control unit 111 can decide the interval as "(120:00-0:00)/5=24:00".

The display control unit 111 may acquire a start edge value, for example, by subtracting a value half the decided interval from the decided specified value and an end edge value by adding the value half the decided interval to the decided specified value. In the example shown in FIG. 6B, the display control unit 111 can obtain the start edge value "66:00" by subtracting the value "24:00/2" half the decided interval from the decided specified value "78:00". The display control unit 111 can also obtain the end edge value "90:00" by adding the value "24:00/2" half the decided interval to the decided specified value "78:00". The display control unit 111 can specify a new specifiable range by the acquired start edge value and end edge value.

The display control unit 111 updates the start edge value stored in the storage unit 120 with the start edge value of the new specifiable range and the end edge value stored in the storage unit 120 with the end edge value of the new specifiable range. The display control unit 111 causes the touch panel 103 to display the start edge value and the end edge value stored in the storage unit 120. FIG. 6C shows the slider 101a after being updated by the display control unit 111 with the specifiable range. When the start edge value and end edge value of a new specifiable range are displayed by the display control unit 111 on the touch panel 103, the user can easily adjust the specified position of the thumb 101b within the new specifiable range.

Figure 7A:
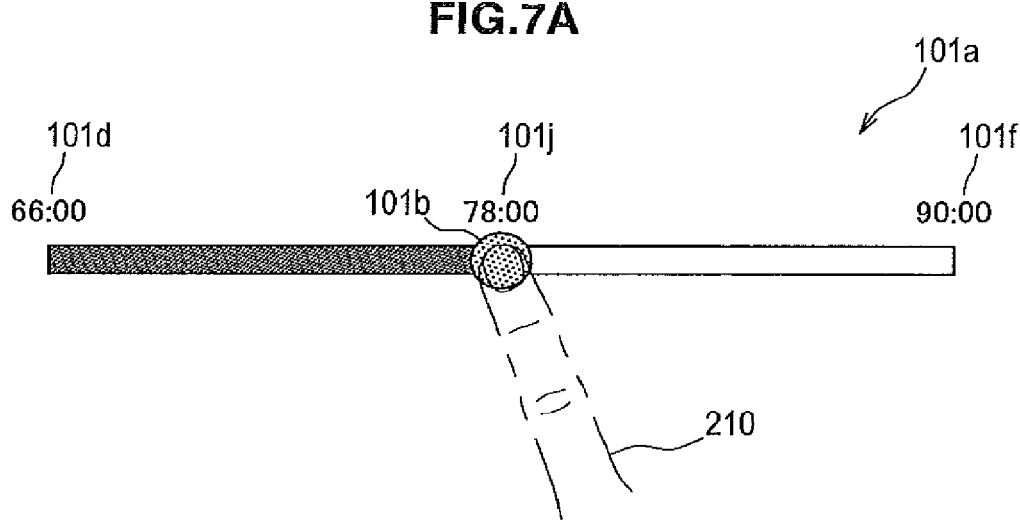
FIGS. 7A-7C are explanatory views (Part 2) illustrating the function of the display control unit of the information processing apparatus according to the first embodiment of the present invention.

The display control unit 111 can repeat the update of a specifiable range described above. FIG. 7A shows the slider 101a after the specified range is updated with a new specifiable range. In the state shown in FIG. 7A, for example, the contact time measuring unit 113 determines whether the measured contact time exceeds the threshold. If the time measuring unit 113 determines that the measured contact time exceeds the threshold, the display control unit 111 decides the interval. The start edge value stored in the storage unit 120 is updated to "66:00" and the end edge value stored in the storage unit 120 is updated to "90:00". Therefore, the display control unit 111 can decide the interval as "(90:00-66:00)/5=4:48".

Figure 7B:
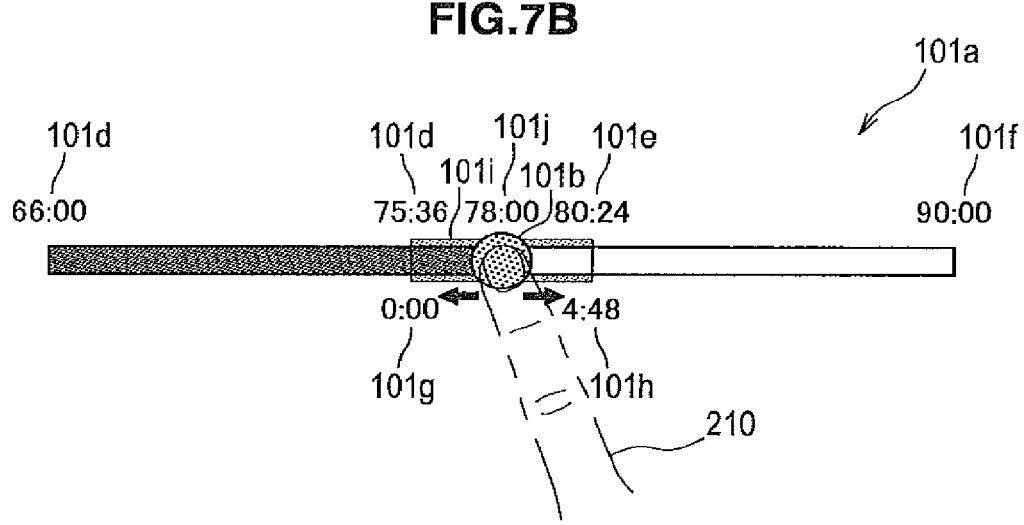

The display control unit 111 can obtain the start edge value "75:36" by subtracting the value "4:48/2" half the decided interval from the decided specified value "78:00". The display control unit 111 can also obtain the end edge value "80:24" by adding the value "4:48/2" half the decided interval to the decided specified value "78:00". The display control unit 111 can specify a new specifiable range by the acquired start edge value and end edge value. FIG. 7B shows the slider 101a displayed when the display control unit 111 decides a new specifiable range.

Figure 7C:
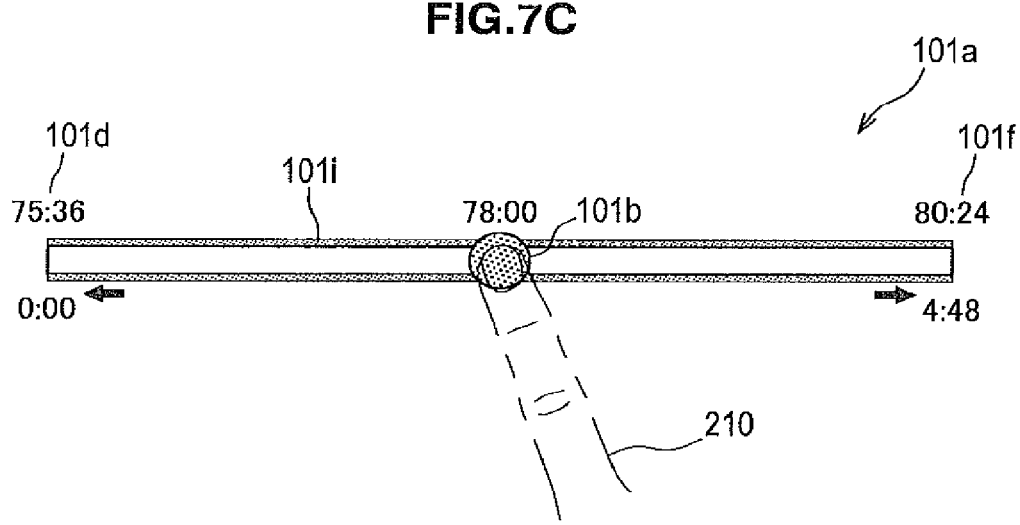

The display control unit 111 updates the start edge value stored in the storage unit 120 with the start edge value of the new specifiable range and the end edge value stored in the storage unit 120 with the end edge value of the new specifiable range. The display control unit 111 causes the touch panel 103 to display the start edge value and the end edge value stored in the storage unit 120. FIG. 7C shows the slider 101a after being updated by the display control unit 111 with the new specifiable range. The display control unit 111 can repeat the update of the specifiable range as described above until the maximum zoom rate is reached. The user can restore the default display of the slider 101a with the start edge value "0:00" and end edge value "120:00" by moving the operating body 210 off the touch panel 103 to cancel zooming of the slider 101a.

Figure 8A:
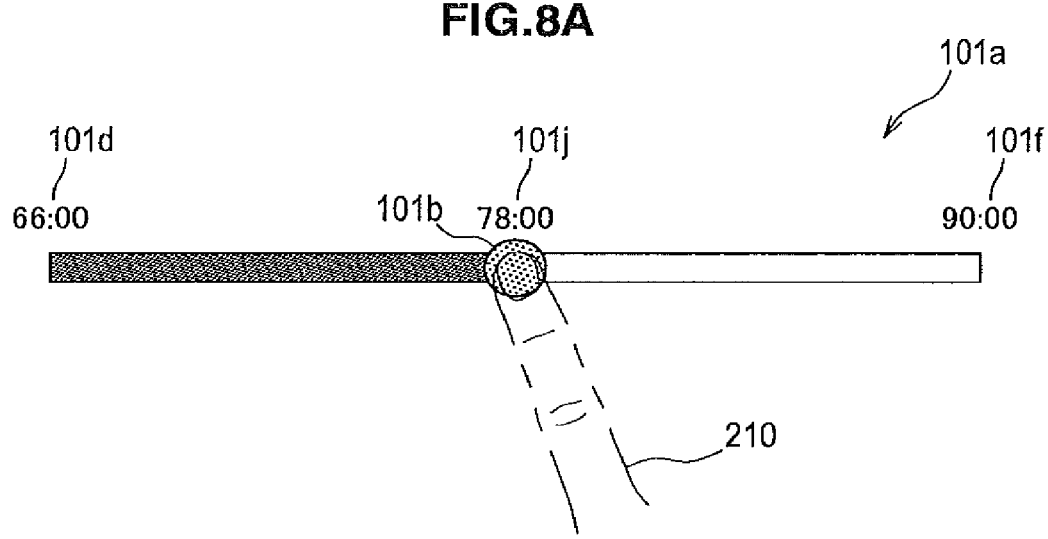
FIGS. 8A and 8B are explanatory views (Part 3) illustrating the function of the display control unit of the information processing apparatus according to the first embodiment of the present invention.
Figure 8B:
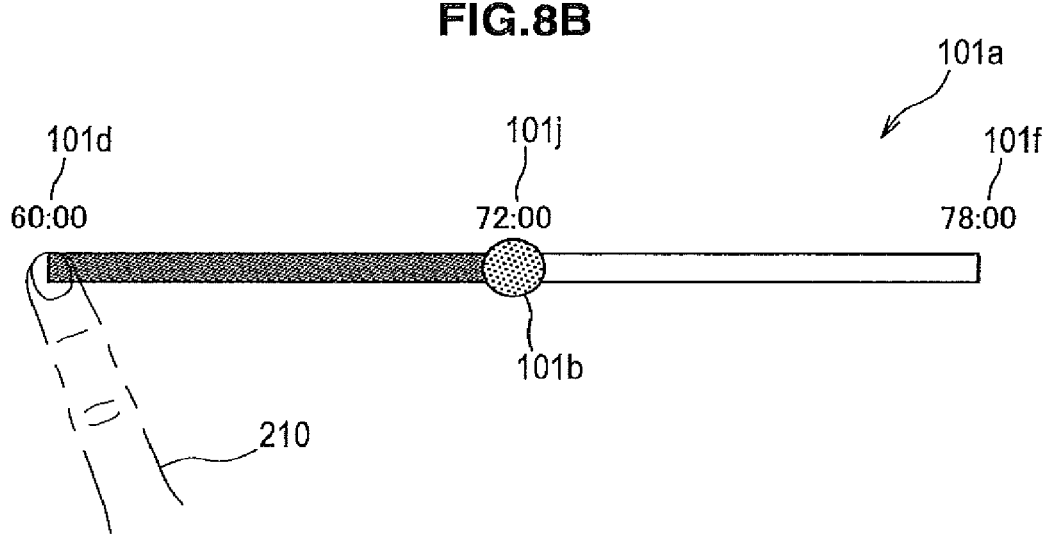

FIG. 8A shows the slider 101a after the specified range is updated with a new specifiable range. That is, the slider 101a shown in FIG. 8A is the same as the slider 101a shown in FIG. 7A. Assume, for example, that the touch panel 103 acquires position information indicating the position of the start edge of the slider 101a in the state shown in FIG. 8A. In that case, the display control unit 111 may acquire a new start edge value by subtracting a scroll value, which is a value in accordance with an interval, from the start edge value stored in the storage unit 120 to update the start edge value stored in the storage unit 120 with the acquired new start edge value. In addition, the display control unit 111 may acquire a new end edge value by subtracting the scroll value from the end edge value stored in the storage unit 120 to update the end edge value stored in the storage unit 120 with the acquired new end edge value. Then, the display control unit 111 causes the touch panel 103 to display the start edge value and the end edge value stored in the storage unit 120. The start edge value and the end edge value of the slider 101a displayed at this point are scrolled in the direction in which the value decreases. FIG. 8B shows the slider 101a after being scrolled.

Similarly, assume, for example, that the touch panel 103 acquires position information indicating the position of the end edge of the slider 101a in the state shown in FIG. 8A. In that case, the display control unit 111 may acquire a new start edge value by adding a scroll value, which is a value in accordance with an interval, to the start edge value stored in the storage unit 120 to update the start edge value stored in the storage unit 120 with the acquired new start edge value. In addition, the display control unit 111 may acquire a new end edge value by adding the scroll value to the end edge value stored in the storage unit 120 to update the end edge value stored in the storage unit 120 with the acquired new end edge value. Then, the display control unit 111 causes the touch panel 103 to display the start edge value and the end edge value stored in the storage unit 120. The start edge value and the end edge value of the slider 101a displayed at this point are scrolled in the direction in which the value increases.

[1-5. Operation of Information Processing Apparatus]

Figure 9:
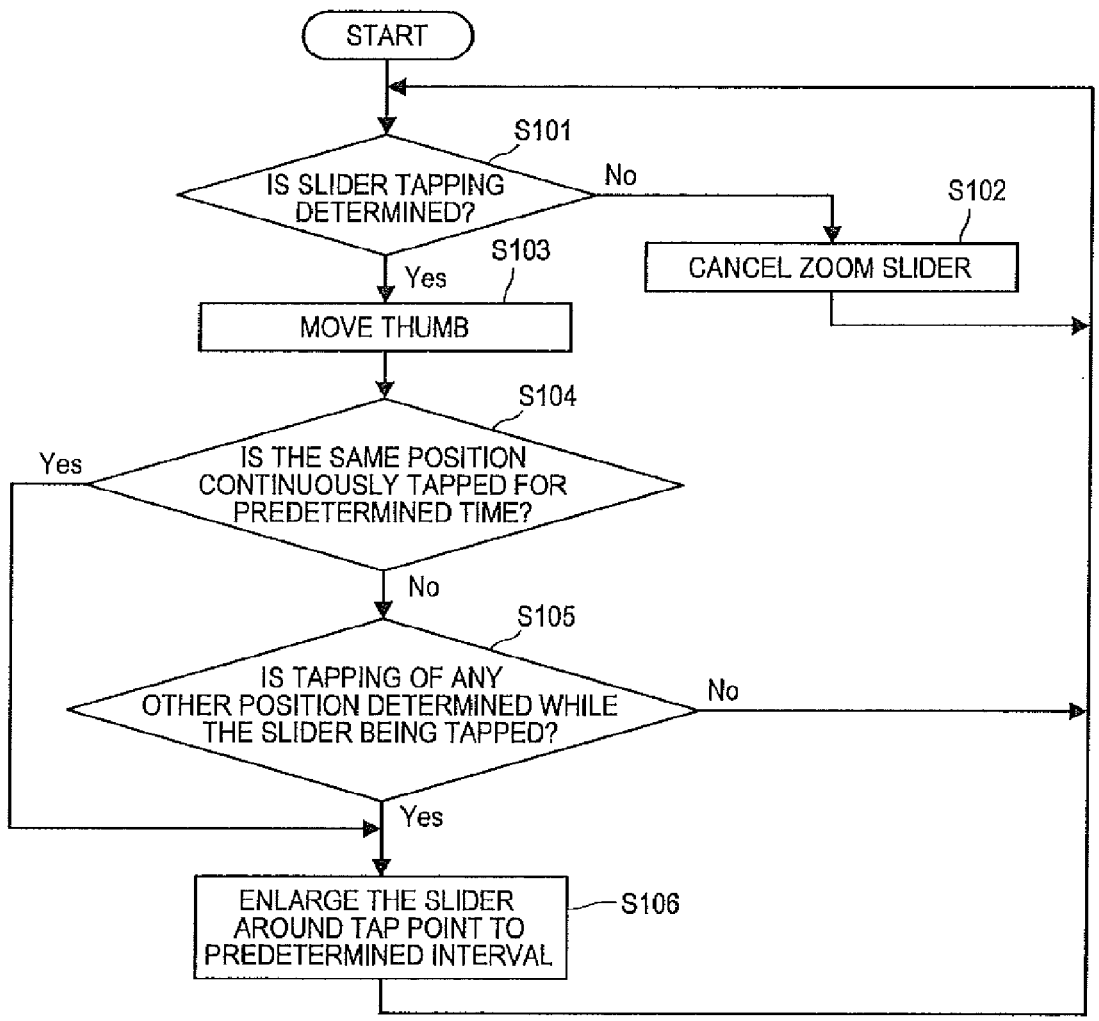
FIG. 9 is a flow chart showing an operation of the information processing apparatus according to the first embodiment of the present invention.

FIG. 9 is a flow chart showing an operation of the information processing apparatus according to the first embodiment of the present invention. The operation of the information processing apparatus according to the first embodiment of the present invention will be described below using FIG. 9 (FIG. 1 to FIG. 8 are also referenced when appropriate).

First, the information processing apparatus 100 generates a thread that continues to monitor whether the screen is tapped when an application is activated. The display control unit 111 determines therein whether the slider 101a is tapped (step S101). If the display control unit 111 determines that the slider 101a is not tapped ("No" at step S101), the display control unit 111 cancels a zoom slider (step S102) before returning to step S101. If the display control unit 111 determines that the slider 101a is tapped ("Yes" at step S101), the display control unit 111 moves the thumb 101b to the tapped position (step S103) and the processing unit 112 performs processing in accordance with the tapped position.

The display control unit 111 determines whether the operating body 210 continues to tap the same position for a predetermined time (step S104). If the display control unit 111 determines that the operating body 210 continues to tap the same position for a predetermined time ("Yes" at step S104), the display control unit 111 proceeds to step S106. If the display control unit 111 determines that the operating body 210 does not continue to tap the same position for a predetermined time ("No" at step S104), the display control unit 111 determines whether any other position is tapped while the slider 101a being tapped (step S105). If the display control unit 111 determines that no other position is tapped while the slider 101a being tapped ("No" at step S105), the display control unit 111 returns to step S101. If the display control unit 111 determines that another position is tapped while the slider 101a being tapped ("Yes" at step S105), the display control unit 111 proceeds to step S106.

Subsequently, the display control unit 111 performs processing to enlarge the slider 101a around the tap point to a predetermined interval (step S106). After the enlargement is finished, the display control unit 111 returns to step S101 to repeat the processing.

2. Second Embodiment

Subsequently, the second embodiment of the present invention will be described. The hardware configuration of an information processing apparatus according to the second embodiment of the present invention is similar to that of an information processing apparatus according to the first embodiment of the present invention. Therefore, the description of the hardware configuration of an information processing apparatus according to the second embodiment of the present invention is omitted. When the information processing apparatus 100 according to the second embodiment should be distinguished from the information processing apparatus 100 according to other embodiments, the information processing apparatus will be denoted as an information processing apparatus 100b. If there is no need to distinguish the information processing apparatus 100, the information processing apparatus will be denoted as the information processing apparatus 100.

[2-1. Function of Information Processing Apparatus]

Figure 10:
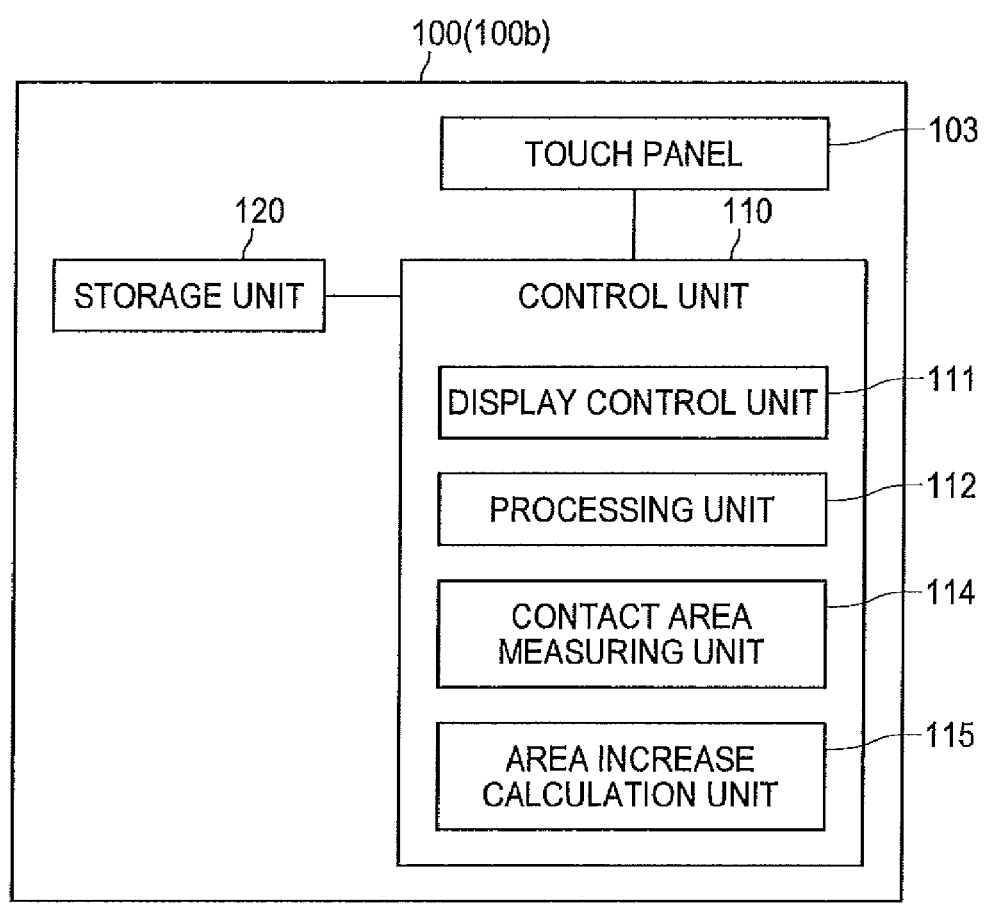
FIG. 10 is a functional block diagram of an information processing apparatus according to a second embodiment of the present invention.

FIG. 10 is a functional block diagram of the information processing apparatus according to the second embodiment of the present invention. The function of the information processing apparatus according to the second embodiment of the present invention will be described below using FIG. 10 (FIG. 1 to FIG. 9 are also referenced when appropriate). Here, only blocks of the functional configuration of the information processing apparatus according to the second embodiment of the present invention that are different from those of the functional configuration of the information processing apparatus according to the first embodiment of the present invention will be described.

In the second embodiment, as shown in FIG. 10, the contact state quantity acquisition unit is provided with a contact area measuring unit 114 that measures a contact area of the touch panel 103 with the operating body 210 and acquires the contact area as a contact state quantity. In this case, a touch panel (for example, an electrostatic touch panel) capable of acquiring a contact area of the contact surface 102a with the operating body 210 can be used as the touch panel 103. In addition to the contact area measuring unit 114, the contact state quantity acquisition unit may further be provided with an area increase calculation unit 115 that calculates an area increase, which is an increase in contact area measured by the contact area measuring unit 114, in a predetermined time up to the present time and acquires the area increase as a contact state quantity. Here, the predetermined time up to the present time may be a time interval between a time that goes back the predetermined time from the present time and the present time or, if the operating body 210 continues to tap the touch panel 103, a time interval between the first tap time and the present time.

[2-2. Operation of Information Processing Apparatus]

Figure 11:
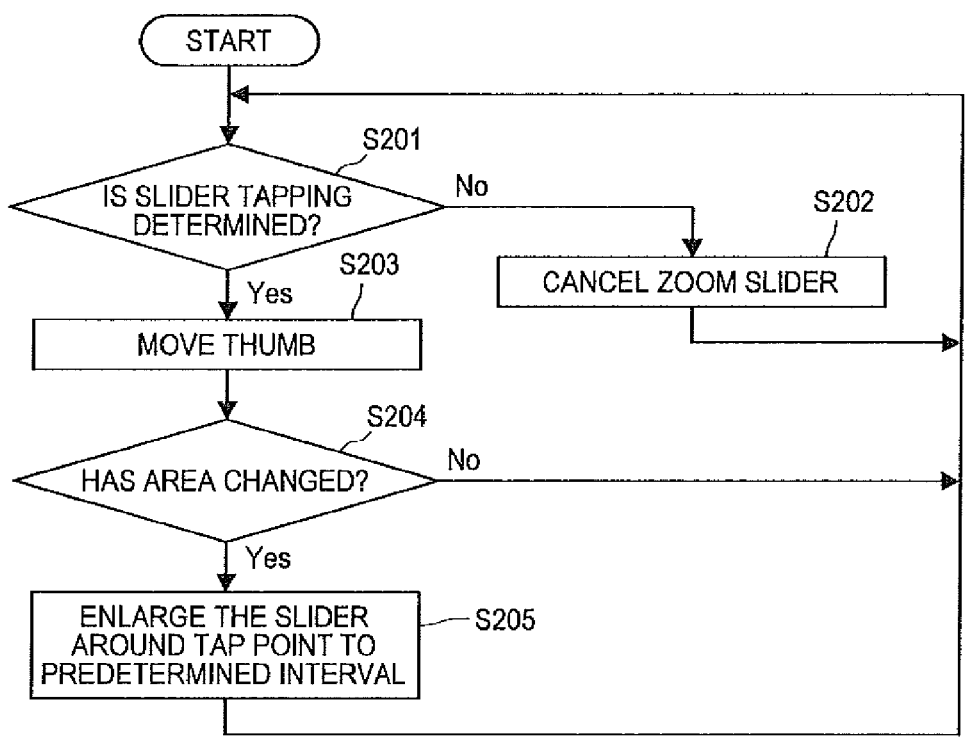
FIG. 11 is a flow chart showing an operation of the information processing apparatus according to the second embodiment of the present invention.

FIG. 11 is a flow chart showing the operation of the information processing apparatus according to the second embodiment of the present invention. The operation of the information processing apparatus according to the second embodiment of the present invention will be described below using FIG. 11 (FIG. 1 to FIG. 10 are also referenced when appropriate).

First, the information processing apparatus 100 generates a thread that continues to monitor whether the screen is tapped when an application is activated. The display control unit 111 determines therein whether the slider 101a is tapped (step S201). If the display control unit 111 determines that the slider 101a is not tapped ("No" at step S201), the display control unit 111 cancels a zoom slider (step S202) before returning to step S201. If the display control unit 111 determines that the slider 101a is tapped ("Yes" at step S201), the display control unit 111 moves the thumb 101b to the tapped position (step S203) and the processing unit 112 performs processing in accordance with the tapped position.

The display control unit 111 determines whether the area of a portion being tapped by the operating body 210 has changed (step S204). If the display control unit 111 determines that the area has not changed ("No" at step S204), the display control unit 111 returns to step S101. If the display control unit 111 determines that the area has changed ("Yes" at step S204), the display control unit 111 performs processing to enlarge the slider 101a around the tap point to a predetermined interval (step S205). After the enlargement is finished, the display control unit 111 returns to step S201 to repeat the processing.

3. Third Embodiment

Subsequently, the third embodiment of the present invention will be described.

[3-1. Hardware Configuration of Information Processing Apparatus]

Figure 12:
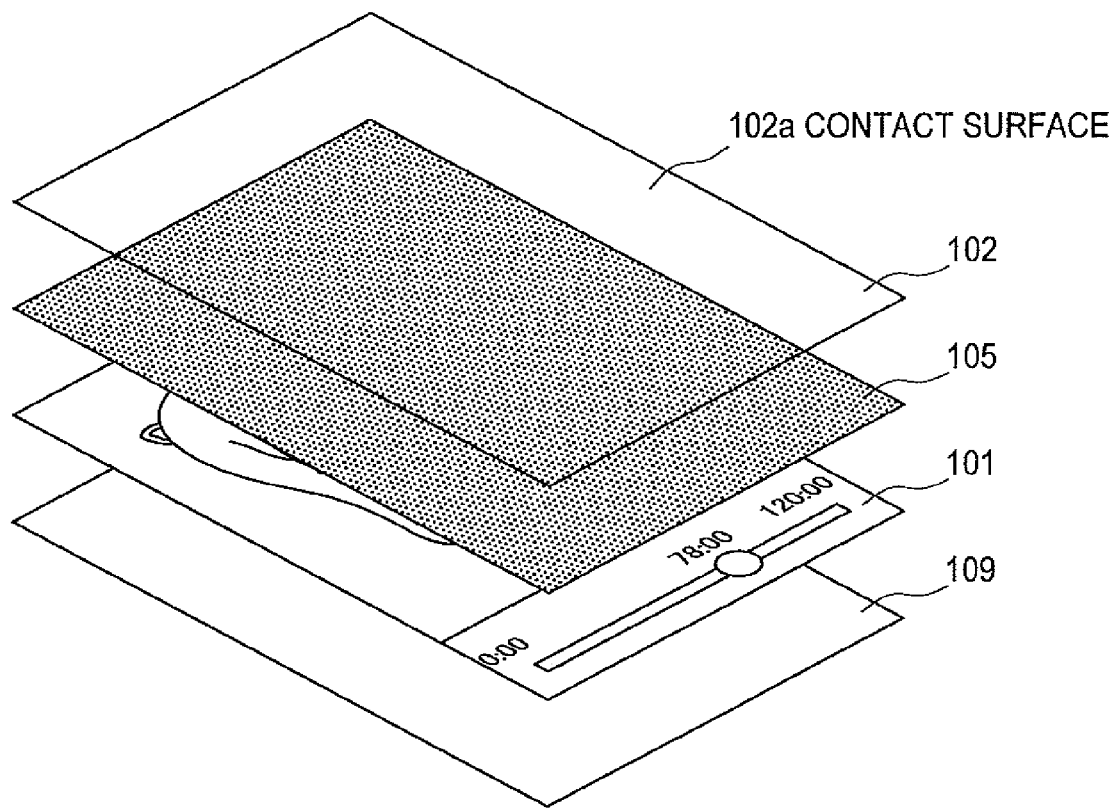
FIG. 12 is an exploded perspective view showing the hardware configuration of an information processing apparatus according to a third embodiment of the present invention.

Next, the hardware configuration of the information processing apparatus according to the third embodiment of the present invention will be described. FIG. 12 is an exploded perspective view showing the hardware configuration of the information processing apparatus according to the third embodiment of the present invention. The hardware configuration of the information processing apparatus according to the third embodiment of the present invention will be described below using FIG. 12 (FIG. 1 is also referenced when appropriate). When the information processing apparatus 100 according to the third embodiment should be distinguished from the information processing apparatus 100 according to other embodiments, the information processing apparatus will be denoted as an information processing apparatus 100c. If there is no need to distinguish the information processing apparatus 100, the information processing apparatus will be denoted as the information processing apparatus 100. Only differences from the hardware configuration of the information processing apparatus 100a according to the first embodiment will be described.

As shown in FIG. 12, a pressure sensor 105 is arranged below the information input apparatus 102 of the information processing apparatus 100c. The pressure sensor 105 may be arranged, as shown in FIG. 12, over the entire surface below the information input apparatus 102 or set up at predetermined locations (for example, four corners), but the location where the pressure sensor 105 is arranged is not specifically limited. The pressure sensor 105 may be arranged at any location where pressure received by the contact surface 102a from the operating body 210 can be detected when the user presses the information input apparatus 102 through the operating body 210.

Figure 13:
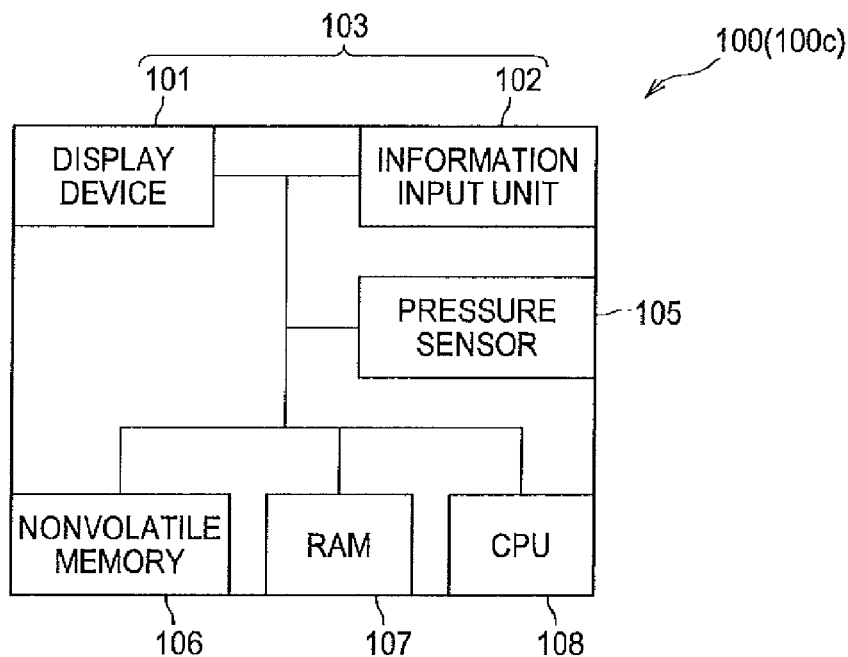
FIG. 13 is a block diagram showing the hardware configuration of the information processing apparatus according to the third embodiment of the present invention.

FIG. 13 is a block diagram showing the hardware configuration of the information processing apparatus according to the third embodiment of the present invention. The hardware configuration of the information processing apparatus according to the third embodiment of the present invention will be described below using FIG. 13 (FIG. 1 and FIG. 12 are also referenced when appropriate).

As shown in FIG. 13, the information processing apparatus 100c according to the third embodiment of the present invention further includes the pressure sensor 105. The pressure sensor 105 can detect, as described above, pressure received by the contact surface 102a from the operating body 210 and the type thereof is not specifically limited.

In the foregoing, the hardware configuration of the information processing apparatus 100c according to the third embodiment of the present invention has been described. Next, the function of the information processing apparatus 100c according to the third embodiment of the present invention will be described.

[3-2. Operation of Information Processing Apparatus]

Figure 14:
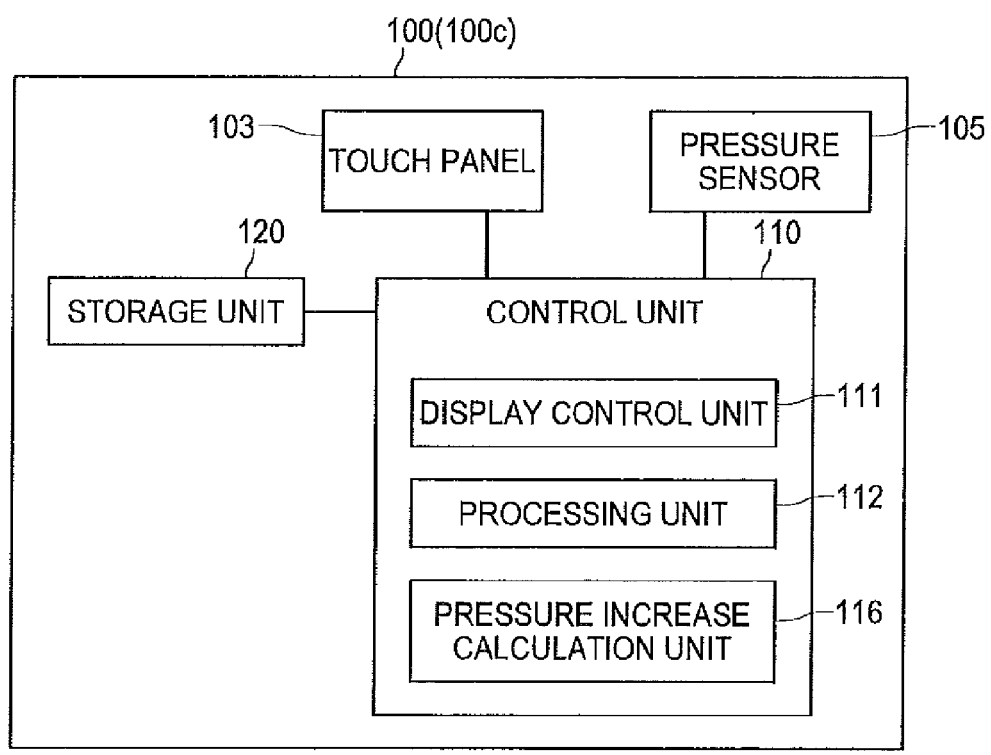
FIG. 14 is a functional block diagram of the information processing apparatus according to the third embodiment of the present invention.

FIG. 14 is a functional block diagram of the information processing apparatus according to the third embodiment of the present invention. The function of the information processing apparatus according to the third embodiment of the present invention will be described below using FIG. 14

(FIG. 1 to FIG. 13 are also referenced when appropriate). Here, only blocks of the functional configuration of the information processing apparatus according to the third embodiment of the present invention that are different from those of the functional configuration of the information processing apparatus according to the first embodiment of the present invention will be described.

In the third embodiment, as shown in FIG. 14, the contact state quantity acquisition unit is provided with the pressure sensor 105 (pressure measuring unit) that measures the magnitude of pressure exerted on the touch panel 103 by the operating body 210 and acquires the magnitude of measured pressure as a contact state quantity. In addition to the pressure sensor 105, the contact state quantity acquisition unit may further be provided with a pressure increase calculation unit 116 that calculates a pressure increase, which is an increase in magnitude of pressure measured by the pressure sensor 105, in a predetermined time up to the present time and acquires the pressure increase as a contact state quantity. Here, as described above, the predetermined time up to the present time may be a time interval between a time that goes back the predetermined time from the present time and the present time or, if the operating body 210 continues to tap the touch panel 103, a time interval between the first tap time and the present time.

[3-3. Operation of Information Processing Apparatus]

Figure 15:
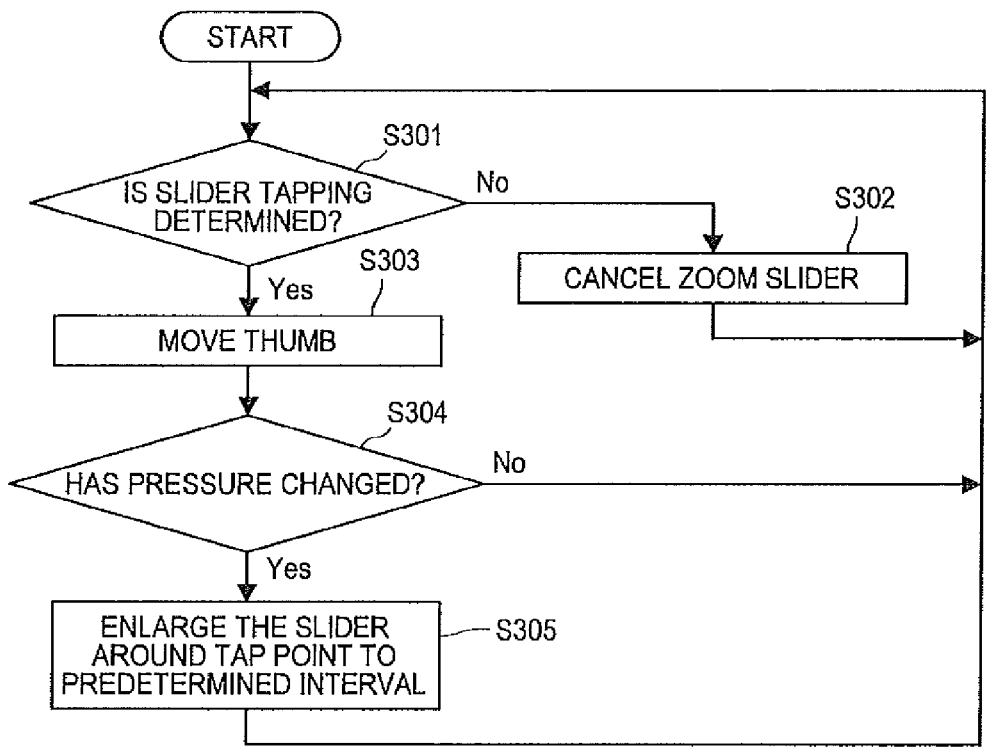
FIG. 15 is a flow chart showing an operation of the information processing apparatus according to the third embodiment of the present invention.

FIG. 15 is a flow chart showing the operation of the information processing apparatus according to the third embodiment of the present invention. The operation of the information processing apparatus according to the third embodiment of the present invention will be described below using FIG. 15 (FIG. 1 to FIG. 14 are also referenced when appropriate).

First, the information processing apparatus 100 generates a thread that continues to monitor whether the screen is tapped when an application is activated. The display control unit 111 determines therein whether the slider 101a is tapped (step S301). If the display control unit 111 determines that the slider 101a is not tapped ("No" at step S301), the display control unit 111 cancels a zoom slider (step S302) before returning to step S301. If the display control unit 111 determines that the slider 101a is tapped ("Yes" at step S301), the display control unit 111 moves the thumb 101b to the tapped position (step S303) and the processing unit 112 performs processing in accordance with the tapped position.

The display control unit 111 determines whether the pressure measured by the pressure sensor 105 has changed (step S304). If the display control unit 111 determines that the pressure has not changed ("No" at step S304), the display control unit 111 returns to step S101. If the display control unit 111 determines that the pressure has changed ("Yes" at step S304), the display control unit 111 performs processing to enlarge the slider 101a around the tap point to a predetermined interval (step S305). After the enlargement is finished, the display control unit 111 returns to step S301 to repeat the processing.

4. Fourth Embodiment

Subsequently, the fourth embodiment of the present invention will be described. The hardware configuration of an information processing apparatus according to the fourth embodiment of the present invention is similar to that of an information processing apparatus according to the first embodiment of the present invention. Therefore, the description of the hardware configuration of an information processing apparatus according to the fourth embodiment of the present invention is omitted. When the information processing apparatus 100 according to the fourth embodiment should be distinguished from the information processing apparatus 100 according to other embodiments, the information processing apparatus will be denoted as an information processing apparatus 100d. If there is no need to distinguish the information processing apparatus 100, the information processing apparatus will be denoted as the information processing apparatus 100.

[4-1. Function of Information Processing Apparatus]

Figure 16:
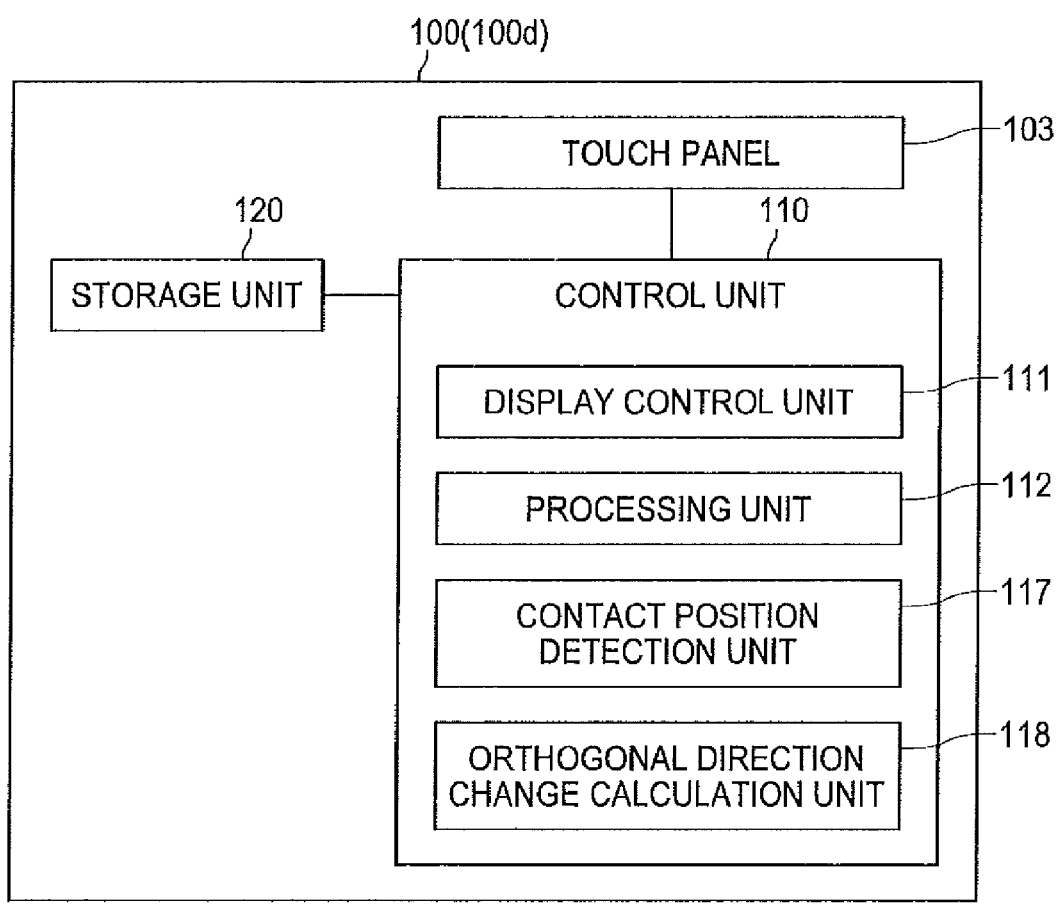
FIG. 16 is a functional block diagram of an information processing apparatus according to a fourth embodiment of the present invention.

FIG. 16 is a functional block diagram of the information processing apparatus according to the fourth embodiment of the present invention. The function of the information processing apparatus according to the fourth embodiment of the present invention will be described below using FIG. 16 (FIG. 1 to FIG. 15 are also referenced when appropriate). Here, only blocks of the functional configuration of the information processing apparatus according to the fourth embodiment of the present invention that are different from those of the functional configuration of the information processing apparatus according to the first embodiment of the present invention will be described.

In the fourth embodiment, as shown in FIG. 16, the contact state quantity acquisition unit is provided with a contact position detection unit 117 that detects the contact position on the touch panel 103 by the operating body 210 and acquires the detected contact position as a contact state quantity. The contact state quantity acquisition unit may further be provided with an orthogonal direction change calculation unit 118 that calculates an orthogonal direction change, which is a change of the contact position detected by the contact position detection unit 117 in a direction orthogonal to the slider 101a, in a predetermined time up to the present time and acquires the calculated orthogonal direction change as a contact state quantity.

Here, the predetermined time up to the present time may be a time interval between a time that goes back the predetermined time from the present time and the present time or, if the operating body 210 continues to tap the touch panel 103, a time interval between the first tap time and the present time. If, for example, the direction (longitudinal direction) in which the slider 101a extends is the X-axis direction and a direction orthogonal to the X-axis direction is the Y-axis direction, a change of coordinate (Y coordinate) in the Y-axis direction corresponds to a change in a direction orthogonal to the slider 101a.

If, for example, an orthogonal direction change acquired by the orthogonal direction change calculation unit 118 as a contact state quantity is equal to or more than a predetermined quantity, the display control unit 111 may decide an interval to decide a new specifiable range. The predetermined quantity is not specifically limited and may be set to, for example, the length of predetermined pixels (for example, the length corresponding to 30 pixels). For example, the user taps the touch panel 103 by a tip portion (such as a fingertip) of the operating body 210 and then, taps the touch panel 103 by another portion (such as a finger cushion) of the operating body 210 by laying down the operating body 210. After such tapping is done, the Y coordinate changes from the contact position with the tip portion of the operating body 210 to that with a portion other than the tip portion of the operating body 210 and thus, the orthogonal direction change calculation unit 118 can detect the change of the Y coordinate as a contact state quantity. Therefore, similar to the case in which a technique to measure the contact area is used by simple coordinate comparisons shown in the second embodiment, a contact state quantity of the touch panel 103 with the operating body 210 can be acquired.

[4-2. Operation of Information Processing Apparatus]

Figure 17:
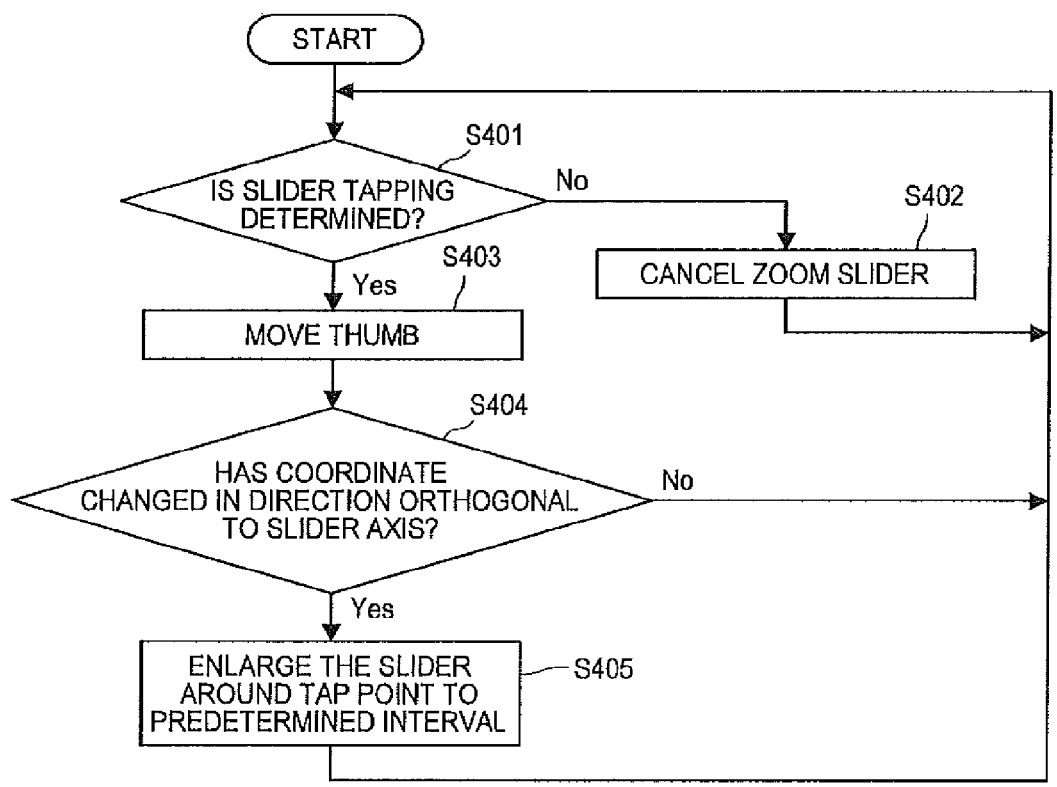
FIG. 17 is a flow chart showing an operation of the information processing apparatus according to the fourth embodiment of the present invention.
Figure 18:
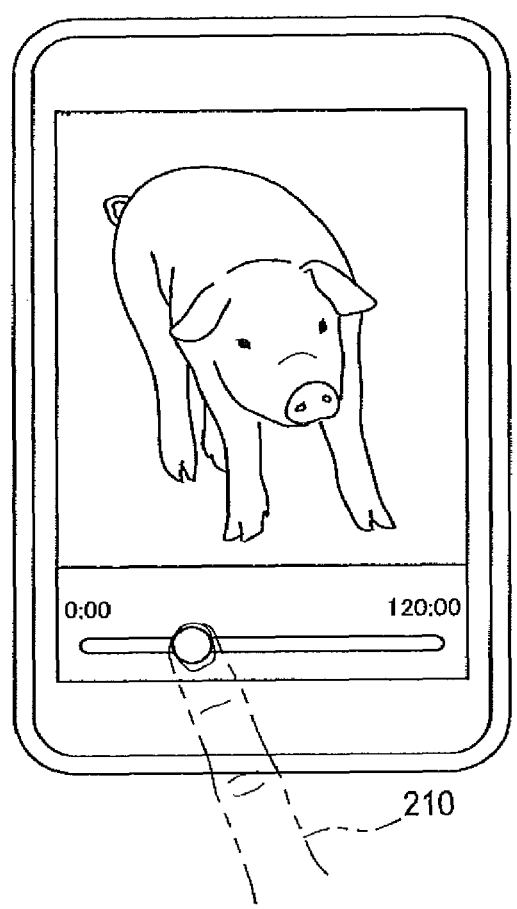
FIG. 18 is a diagram showing a slider in related art.

FIG. 17 is a flow chart showing the operation of the information processing apparatus according to the fourth embodiment of the present invention. The operation of the information processing apparatus according to the fourth embodiment of the present invention will be described below using FIG. 17 (FIG. 1 to FIG. 16 are also referenced when appropriate).

First, the information processing apparatus 100 generates a thread that continues to monitor whether the screen is tapped when an application is activated. The display control unit 111 determines therein whether the slider 101a is tapped (step S401). If the display control unit 111 determines that the slider 101a is not tapped ("No" at step S401), the display control unit 111 cancels a zoom slider (step S402) before returning to step S401. If the display control unit 111 determines that the slider 101a is tapped ("Yes" at step S401), the display control unit 111 moves the thumb 101b to the tapped position (step S403) and the processing unit 112 performs processing in accordance with the tapped position.

The display control unit 111 determines whether a change of coordinate in a direction orthogonal to the slider axis of a portion being tapped by the operating body 210 has occurred (step S404). If the display control unit 111 determines that no change of coordinate in a direction orthogonal to the slider axis has occurred ("No" at step S404), the display control unit 111 returns to step S401. If the display control unit 111 determines that a change of coordinate in a direction orthogonal to the slider axis has occurred ("Yes" at step S404), the display control unit 111 performs processing to enlarge the slider 101a around the tap point to a predetermined interval (step S405). After the enlargement is finished, the display control unit 111 returns to step S401 to repeat the processing.

5. Summary

According to the embodiments of the present invention, the start point and end point of a slider can recursively be zoomed in around the position being tapped in accordance with a contact state quantity (such as the time during which the slider is tapped, a contact area of a tapping finger, pressure of a tapping finger, and a change of coordinate in a direction orthogonal to the slider axis) of a operating body with respect to the slider. Accordingly, fine pointing in seconds can be accomplished even if a drag operation of long-time content such as 120 min is performed in an apparatus in which an adequate screen area is not secured using a pointing interface with a wide setup area such as a finger. Moreover, accordingly, an operation enabling direct time designation, which is characteristic of a slider in related art, can be realized.

It should be understood by those skilled in the art that various modifications, combinations, sub-combinations and alterations may occur depending on design requirements and other factors insofar as they are within the scope of the appended claims or the equivalents thereof.

What is claimed is:

1. An apparatus for displaying a content, the apparatus comprising:
   a control circuitry configured to generate and display a slider object associated with a timeline related to the content, wherein the content is a video content and the slider object represents a playback range of the video content, the slider object indicating a first range of the timeline comprising a start edge value of the first range and an end edge value of the first range,
   wherein, when a user selects a position on the slider object by touching the screen of the apparatus for a period of time exceeding a threshold time amount, the control circuitry is configured to identify and display a time on the timeline corresponding to the selected position on the slider object, wherein
   the control circuitry is configured to display a thumb on the slider object that indicates a current position of the user selection on the slider object, wherein the control circuitry is configured to calculate an interval corresponding to a second range of the timeline and generate an updated start edge value which replaces the start edge value of the first range displayed by the slider object based on the current position of the user selection on the slider object indicated by the thumb, wherein the control circuitry is configured to generate an updated end edge value which replaces the end edge value of the first range displayed by the slider object, wherein
   the slider object displays the second range of the timeline without displaying the entirety of the first range of the timeline, and wherein the control circuitry is further configured to display an indication of a time on the timeline corresponding to the current position of the user selection on the slider object indicated by the thumb.

2. The apparatus according to claim 1, wherein, when the user ceases using the thumb, the display reverts to the slider object and the start edge value of the first range replaces the updated start edge value.

3. A method for displaying a content, the method comprising:
   generating a display object associated with a parameter related to the content, wherein the content is a video content and the display object represents a playback range of the video content, the display object displaying a first range of the parameter; and
   replacing the display object according to an operation of a user,
   wherein, when the user selects a position on the display object by touching the screen of the display for a period of time exceeding a threshold time amount, a zoomed display object replaces the display object, wherein
   the zoomed display object corresponds to an interval that is calculated from the user selection and the zoomed display object displays a second range of the parameter having an updated start edge value which replaces the start edge value of the first range, and an updated end edge value which replaces the end edge value of the first range, without displaying the entirety of the first range of the parameter.

4. The method according to claim 3, wherein, when the user ceases using the zoomed display object, the display reverts to the display object and the first range of the parameter replaces the second range of the parameter.

5. An apparatus for displaying a content, the apparatus comprising:
   a control circuitry configured to generate and display a slider object associated with a timeline related to the content, wherein the content is a video content and the slider object represents a playback range of the video content,
   wherein, when a user selects a position on the slider object by touching the screen of the display, the control circuitry is configured to display a thumb on the slider object that indicates a current position of the user selection on the slider object and displays a playback value, and wherein the control circuitry is further configured to identify an orthogonal movement from the user's selected position on the timeline and display a predetermined interval around the thumb to adjust the playback speed, wherein the slider object is enlarged around the thumb.

6. The apparatus of claim 5, wherein the distance of orthogonal movement dictates the predetermined interval around the thumb to adjust the playback speed.

* * * * *